(12) United States Patent
Mao et al.

(10) Patent No.: US 11,755,677 B2
(45) Date of Patent: Sep. 12, 2023

(54) DATA MINING METHOD, DATA MINING APPARATUS, ELECTRONIC DEVICE AND STORAGE MEDIUM

(71) Applicant: Beijing Baidu Netcom Science Technology Co., Ltd., Beijing (CN)

(72) Inventors: Qin Mao, Beijing (CN); Pei Zou, Beijing (CN); Yue Zhang, Beijing (CN); Yan Liu, Beijing (CN); Haichao Deng, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 2 days.

(21) Appl. No.: 17/646,683

(22) Filed: Dec. 31, 2021

(65) Prior Publication Data

US 2023/0004613 A1   Jan. 5, 2023

(30) Foreign Application Priority Data

Jun. 30, 2021 (CN) .......................... 202110742126.6

(51) Int. Cl.
*G06F 16/00* (2019.01)
*G06F 16/9538* (2019.01)
*G06F 16/955* (2019.01)
*G06F 16/9537* (2019.01)
*G06F 16/951* (2019.01)
*G06F 40/30* (2020.01)

(52) U.S. Cl.
CPC ........ *G06F 16/9538* (2019.01); *G06F 16/951* (2019.01); *G06F 16/955* (2019.01); *G06F 16/9537* (2019.01); *G06F 40/30* (2020.01); *G06F 2216/03* (2013.01)

(58) Field of Classification Search
CPC .............. G06F 16/9538; G06F 16/951; G06F 16/9537; G06F 16/955; G06F 40/30; G06F 2216/03; G06F 16/353; G06F 16/2465; G06F 16/35; G06F 16/9535; G06F 16/9566; G06F 18/24
See application file for complete search history.

(56) References Cited

U.S. PATENT DOCUMENTS

| | | | | |
|---|---|---|---|---|
| 9,183,203 | B1* | 11/2015 | Tuchman | G06F 16/3347 |
| 10,757,061 | B1* | 8/2020 | Xu | G06Q 30/0252 |
| 10,896,461 | B2* | 1/2021 | Liu | G06F 16/951 |
| 11,574,150 | B1* | 2/2023 | Sharma | G06F 18/285 |
| 2003/0212691 | A1* | 11/2003 | Kuntala | G06N 7/01 |

(Continued)

*Primary Examiner* — Noosha Arjomandi
(74) *Attorney, Agent, or Firm* — ArentFox Schiff LLP (57) ABSTRACT

The present disclosure discloses a data mining method, a data mining apparatus, an electronic device and a storage medium, relates to the technical field of the Internet, and in particular to the Internet big data processing technology. The method includes: acquiring a current article to be mined; obtaining information values required for each data identification strategy of multiple data identification strategies from the current article, and each data identification strategy is used for identifying a preset type of data; identifying a data type of the current article according to the information values required for each data identification strategy to obtain a data type identification result; and determining whether the current article belongs to any preset type of data according to the data type identification result.

17 Claims, 5 Drawing Sheets

(56) References Cited

U.S. PATENT DOCUMENTS

| | | | |
|---|---|---|---|
| 2007/0112714 A1* | 5/2007 | Fairweather | G06F 8/427 |
| | | | 706/46 |
| 2007/0174290 A1* | 7/2007 | Narang | G06Q 10/06 |
| 2008/0172288 A1* | 7/2008 | Pilskalns | G06Q 30/0273 |
| | | | 705/14.69 |
| 2015/0227497 A1* | 8/2015 | Hao | H04L 63/1441 |
| | | | 707/722 |
| 2017/0118094 A1* | 4/2017 | Rao | H04L 63/083 |
| 2017/0206557 A1* | 7/2017 | Abrol | G06Q 50/01 |
| 2019/0057159 A1* | 2/2019 | Li | G06F 16/9535 |
| 2019/0332602 A1* | 10/2019 | Xu | G06F 16/242 |
| 2020/0175861 A1* | 6/2020 | Wansa | G08G 1/202 |
| 2020/0184278 A1* | 6/2020 | Zadeh | G06N 3/044 |
| 2021/0182695 A1* | 6/2021 | Wang | G06N 20/00 |
| 2021/0334278 A1* | 10/2021 | Zhou | G06N 3/08 |
| 2021/0390124 A1* | 12/2021 | Liu | G06T 11/60 |
| 2023/0004613 A1* | 1/2023 | Mao | G06F 16/9537 |

* cited by examiner

DATA MINING METHOD, DATA MINING APPARATUS, ELECTRONIC DEVICE AND STORAGE MEDIUM

CROSS-REFERENCE TO RELATED APPLICATION

The present application claims priority to Chinese Patent Application No. 202110742126.6. filed on Jun. 30, 2021, the disclosure of which is hereby incorporated by reference in its entirety.

TECHNICAL FIELD

The present disclosure relates to the technical field of the Internet, and in particular to a data mining method, a data mining apparatus, an electronic device and a storage medium in the Internet big data processing technology.

BACKGROUND

At present, many enterprises need to analyze the Internet data to mine the required data, and perform further processing based on the mined data. For example, in order to help enterprises analyze the public opinion of Internet data, a public opinion analysis system has emerged, which is mainly configured to monitor public opinions in real time and warn sudden public opinion in time.

It is seen that how to effectively mine the required data from the massive Internet data is an important step in network data processing. Specifically, for public opinion analysis, how to effectively mine public opinion data from massive Internet data is one of the most important links in public opinion analysis.

SUMMARY

At least some embodiments of the present disclosure provide a data mining method, a data mining apparatus, an electronic device and a storage medium capable of effectively mining required data.

In an embodiment of the present disclosure, a data mining method is provided, which includes:

acquiring a current article to be mined; obtaining information values required for each data identification strategy of multiple data identification strategies from the current article, and each data identification strategy is used for identifying a preset type of data; identifying a data type of the current article according to the information values required for each data identification strategy to obtain a data type identification result; and determining whether the current article belongs to any preset type of data according to the data type identification result.

In another embodiment of the present disclosure, an electronic device is provided, which includes:

at least one processor; and a memory in communication connection with the at least one processor, the memory is configured to store instructions executable by the at least one processor and, when being executed by the at least one processor, the instructions is used for enabling the at least one processor to execute the method mentioned above.

In another embodiment of the present disclosure, a non-transitory storage medium storing computer instructions, and the computer instructions is used for enabling the computer to execute the method mentioned above.

It should be understood that the content described in this part is not intended to identify key or important features of embodiments of the present disclosure, nor is it intended to limit the scope of the present disclosure. Other features of the present disclosure will be readily understood by the following description.

BRIEF DESCRIPTION OF THE DRAWINGS

The accompanying drawings are for a better understanding of the present solution and do not constitute a limitation of the present disclosure. In the drawings.

DETAILED DESCRIPTION

Exemplary embodiments of the present disclosure are described below in conjunction with the accompanying drawings including various details of the embodiments of the present disclosure for the purpose of understanding and should be considered exemplary. Accordingly, those of ordinary skill in the art would realize that various changes and modifications may be made to the embodiments described herein without departing from the scope and spirit of the present disclosure. Also, for the sake of clarity and conciseness, descriptions of well-known functions and constructions may be omitted in the following description.

At least some embodiments of the present disclosure provides a data mining method, a data mining apparatus, an electronic device and a storage medium capable of effectively mining required data, which will be described in detail in the following analysis.

Figure 1:
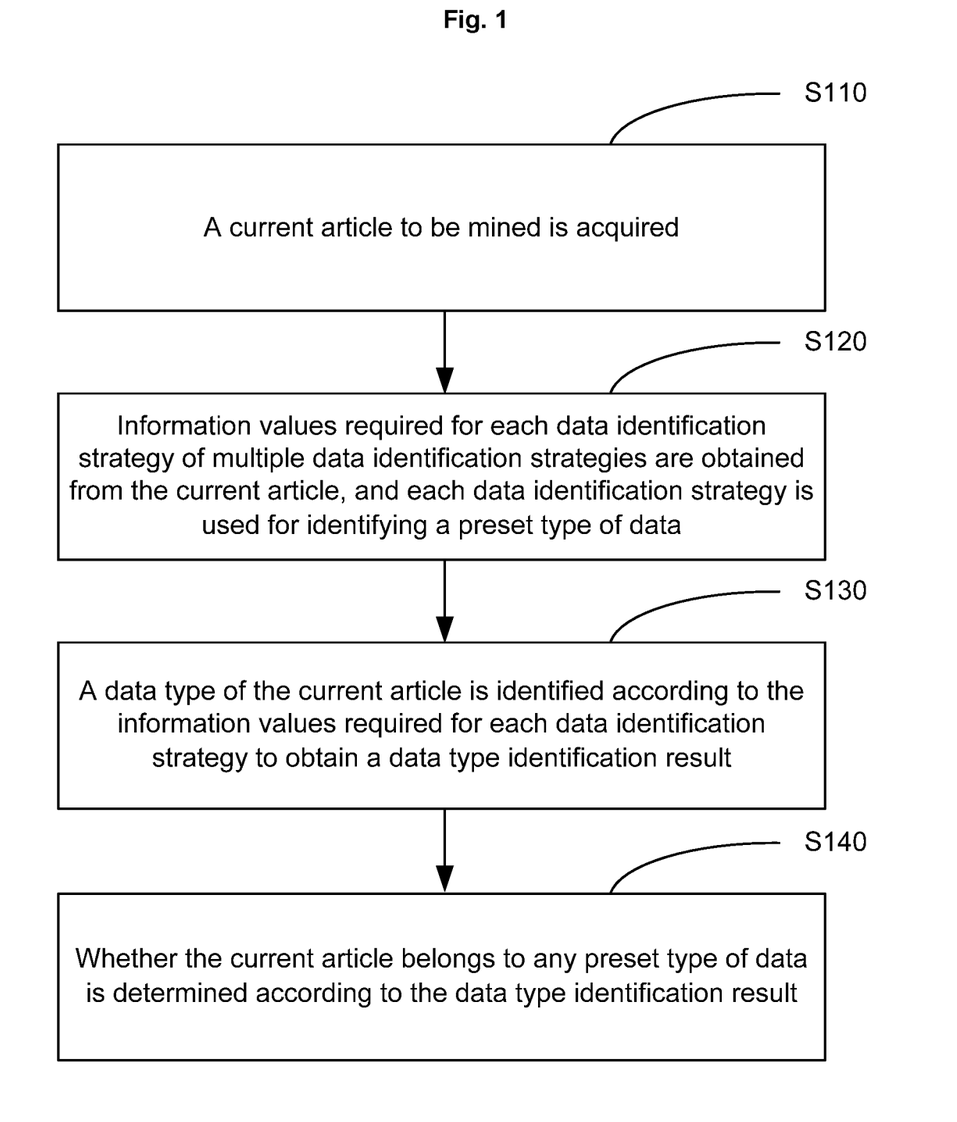
FIG. 1 is a flow diagram of a data mining method according to a first embodiment of the present disclosure.

FIG. 1 is a flow diagram of a data mining method according to a first embodiment of the present disclosure. As shown in FIG. 1, the method includes the following steps.

In Step S110, a current article to be mined is acquired.

In Step S120, information values required for each data identification strategy of multiple data identification strategies are obtained from the current article, and each data identification strategy is used for identifying a preset type of data.

In Step S130, a data type of the current article is identified according to the information values required for each data identification strategy to obtain a data type identification result.

In Step S140, whether the current article belongs to any preset type of data is determined according to the data type identification result.

As is seen from the above embodiment, the data mining method provided by the present disclosure can perform data classification mining on web page data based on the multiple data identification strategies, so as to effectively mine different types of data. Compared with the commonly used manual data mining on the web page data, the data mining method is more efficient and accurate.

In the present disclosure, the data to be mined may be divided into three categories, including: low quality data, low quality content and inaccurate sentiment analysis.

The data mining method provided by the embodiment of the present disclosure is applied to a public opinion system. In order to realize the classification mining of the public opinion data, the public opinion data of the public opinion system is divided into three categories: low quality data, low quality content and inaccurate sentiment analysis.

In this way, when mining the public opinion data, it is possible to mine these three categories, which facilitates the subsequent direct mining of these three categories of public opinion data and classification processing.

An article is the most basic element of the public opinion system, and the low quality data is to measure a quality of the article. The low quality data of the article has a great impact on users, thus it is necessary to mine the article with low quality data, so as to filter this article out directly in the subsequent processing.

As to low quality content of the article, this article is required to be understood to determine whether content of the article includes advertising, pornography and gambling etc. Such low quality content of the article will have a negative impact, thus it is necessary to mine the article with low quality content so that research and development personnel can improve the content filtering algorithm in the future.

Sentiment classification of the article is a characteristic function of the public opinion analysis, which is particularly important for the accuracy of sentimental analysis. Therefore, it is necessary to mine the article with inaccurate sentimental analysis, so that the research and development personnel can improve an algorithm of sentiment polarity analysis in the future.

Figure 2:
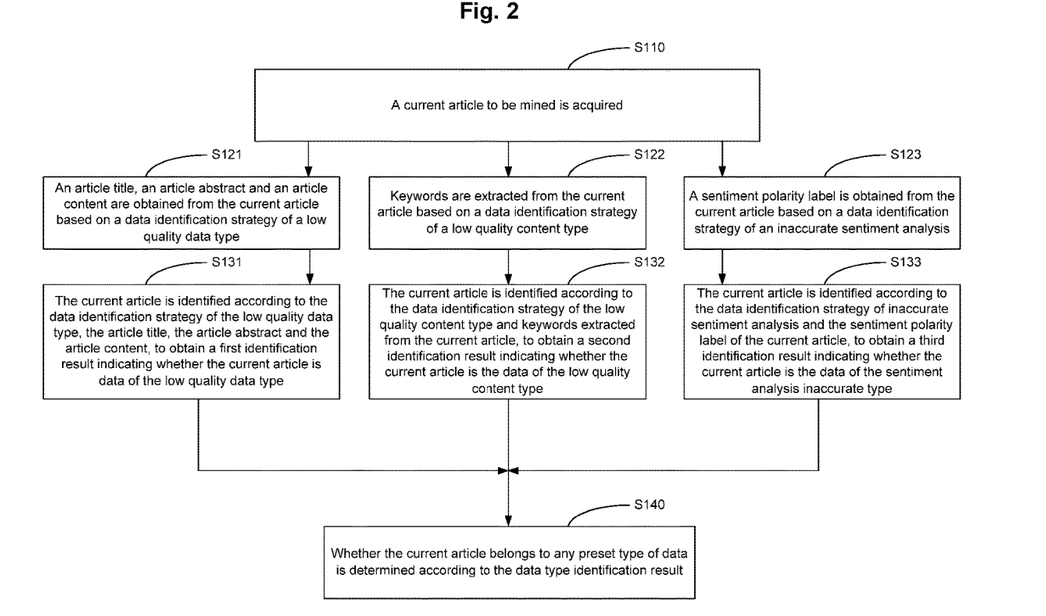
FIG. 2 is a flow diagram of a data mining method according to a second embodiment of the present disclosure.

FIG. 2 is a flow diagram of a data mining method according to a second embodiment of the present disclosure. As shown in FIG. 2, the data mining method refines steps S120 and S130 on the basis of FIG. 1.

Specifically, Step S120 includes the following steps.

In Step S121, an article title, an article abstract and an article content are obtained from the current article based on a data identification strategy of a low quality data type.

When the technical solution of the present disclosure is applied to a public opinion system, for public opinion data of the low quality data type, a public opinion data identification strategy that is adopted in the present disclosure is mainly rule matching. In this embodiment, attribute matching rules for the article title, the article abstract and the article content are defined. Therefore, in this step, the article title, article abstract and article content are obtained from the current article.

In this embodiment, an identification strategy adopted for the public opinion of low quality data is mainly rule matching. On the one hand, the identification strategy of rule matching is easier to intervene, when expanding a scope of evaluating badcase, it is sufficient to directly add rules into the scope of evaluating badcase. On the other hand, it is more explanatory, when the badcase is found, it is possible to directly find out which rule is hit. Finally, it is possible to migrate in multiple fields, which saves a lot of labor costs, such as migrating from the public opinion system to a recommendation system, or migrating from government public opinion to enterprise public opinion, etc.

In Step S122, keywords are extracted from the current article based on a data identification strategy of a low quality content type.

When the technical solution of the present disclosure is applied to the public opinion system, for the public opinion data of the low quality content type, the public opinion data identification strategy that is adopted in the present disclosure is mainly keyword matching. Therefore, in this step, it is possible to extract keywords from the current article.

In Step S123, a sentiment polarity label is obtained from the current article based on a data identification strategy of an inaccurate sentiment analysis.

When the technical solution of the present disclosure is applied to the public opinion system, for the public opinion data of inaccurate sentiment analysis, the public opinion data identification strategy that is adopted in the present disclosure is mainly verifying whether the sentiment polarity label is accurate through different sentiment polarity analysis algorithms. Therefore, in this step, it is possible to obtain the sentiment polarity label from the current article.

Specifically, Step S130 includes the following steps.

In Step S131, the current article is identified according to the data identification strategy of the low quality data type, the article title, the article abstract and the article content, to obtain a first identification result indicating whether the current article is data of the low quality data type.

When the technical solution of the present disclosure is applied to the public opinion system, the step is further described as follows. Whether the article title, the article abstract and the article content of the current article meet preset data rules of the low quality data type is determined. In response to determining that the article title, the article abstract and the article content meet the preset data rules of the low quality data type, the current article is determined to be the data of the low quality data type.

For the article title, the article abstract and the article content, an optional embodiment of the present disclosure may define whether a length of each of the article title, the article abstract and the article content is too long or too short, whether each of the article title, the article abstract and the article content is empty, whether each of the article title, the article abstract and the article content is garbled and other rules. Accordingly, the step is further described as follows. Whether the article title, the article abstract and the article content of the current article meet at least one of a preset text length rule, a garbled rule and a rule for whether the article title matches the article abstract is determined. In response to determining that the article title, the article abstract and the article content meet at least one of the preset text length rule, the garbled rule and the rule for whether the article title matches the article abstract, the current article is determined to be the data of the low quality data type.

In this way, in the process of mining the public opinion data of low quality data in this embodiment, it is possible to further divide the public opinion data into subcategories such as too short or too long title, too short or too long abstract, empty title, empty abstract or repeated content based on different rules.

In addition, the rule for whether the title matches the abstract is further defined in the present disclosure. It is determined that the current article is the data of the low quality data type in response to determining that the current article meets at least one of a text mismatch between the article title and the article abstract, and a semantic mismatch between the article title and the article abstract. In this way, in this step, it is also possible to determine whether the current article is the public opinion data of low quality data type through determining whether the article title matches the article abstract. It is seen that in this embodiment, the public opinion data of low quality data is further identified through determining whether the article title matches the article abstract.

Specifically, in this step, in order to calculate whether the article title matches the article abstract, various calculation indexes are used. The first calculation index is a character matching degree, characters of the article title and the article abstract are separated, and then an overlap ratio of a title character set and an abstract character set is calculated. The second calculation index is a semantic matching degree, a article title vector and a article abstract vector are obtained from Chinese Natural Language Processing (NLP) pre-training model (ERNIE model), and a cosine (cos) distance between the article title vector and the article abstract vector is calculated. In response to the overlap ratio and the cos distance meeting preset matching conditions respectively, the article title is determined to match the article abstract. For example, when the overlap ratio of the title character set and the abstract character set is greater than or equal to a preset overlap threshold, and the cos distance between the article title vector and the article abstract vector is less than a preset distance threshold, it is determined that the article title matches the article abstract.

In addition, an optional embodiment of the present disclosure may further define rules such as periodic detection of dead chains for URL attributes. Thus, URL information of the current article is further obtained in the above Step S121.

In this step, the method may further include the following steps. Whether the URL information of the current article includes an inaccessible dead chain phenomenon is periodically detected based on a preset dead chain periodic detection rule. And it is determined that the current article is the data of the low quality data type in response to the URL information of the current article including the inaccessible dead chain phenomenon.

The specific method is as follows. The URL is periodically accessed, and it is determined that the dead chain phenomenon occurs, and the current article is the data of the low quality data type when response codes returned three times (or more times) in succession indicate that the URL is inaccessible. In this embodiment, the number of successive times is not limited, and is set by the research and development personnel according to the actual situation.

In this way, in this optional embodiment, it is possible to detect an inaccessible article through URL detection, thereby identifying the data of low quality data.

As shown in FIG. 2, in Step S132, the current article is identified according to the data identification strategy of the low quality content type and keywords extracted from the current article, to obtain a second identification result indicating whether the current article is the data of the low quality content type.

In this step, it is possible to perform a first matching on the keywords extracted from the current article with preset keywords corresponding to the data of the low quality content type to obtain a first keyword matching result; and whether the current article is the data of the low quality content type is determined based on the first keyword matching result.

In this embodiment, the data of low quality content mainly includes the data of advertisement, pornography and gambling.

Specifically, when the technical solution of the present disclosure is applied to the public opinion system, the data of these three aspects is determined in different ways.

First, for the data of advertisement, when the first matching result indicates that the first matching is successful, it is determined that the current article is the public opinion data of the low quality content type.

In this way, it is possible to determine whether the current article is the data of advertisement by matching once.

The preset keywords corresponding to the public opinion data of low quality content may be high-frequency advertising keywords selected manually that is saved in advance, and the advertising keywords in an advertising keyword table downloaded from the network is further added.

According to the advertising keyword table downloaded from the network for the first matching, coverage of the identification is improved, and the generalization ability is further enhanced.

Certainly, the method mentioned above is further used for the public opinion data identification of the data of pornography and the data of gambling.

Secondly, for the data of pornography, when the first matching result indicates that the first matching is successful, a second matching is performed on the keywords extracted from the current article with preset trusted keywords to obtain a second keyword matching result. In response to the second keyword matching result indicating that the second matching is successful, the current article is not the public opinion data of the low quality content type. And in response to the second keyword matching result indicating that the second matching is unsuccessful, the current article is the public opinion data of the low quality content type.

Specifically, the present embodiment can adopt a strategy of model and rule to realize the identification of the data of pornography. In the first keyword matching of this embodiment, a preset pornography model trained based on pornography keywords is adopted, the keywords of the current article are input into the pornography model, and an output result indicating whether the keywords of the current article contain pornography keywords and which pornography keywords is obtained. When the pornography model outputs pornography keywords, it indicates that the first match was successful. Then a second matching is performed on the keywords of the current article according to a matching rule of the second time. That is, the keywords extracted from the current article are matched with the preset trusted keywords for the second time, to obtain the second keyword matching result. The trusted keywords here are extracted manually in advance, such as "police", "reported by some media" and so on. In this way, when the current article hits these highly trusted keywords, the pornography label will be cancelled.

In this way, through a secondary keyword matching, the data of pornography is accurately identified, thus reducing the false identification rate of badcase.

Certainly, the method mentioned above is further used for the public opinion data identification of data of advertising and gambling.

Thirdly, for the data of gambling, in response to the first matching result indicating that the first matching is successful, a current website to which the current article belongs is determined. Whether the current website is a website to which the preset public opinion data of the low quality content type belongs is determined. In response to determining that the current website is the website to which the preset public opinion data of the low quality content type belongs, it is determined that the current article is the public opinion data of the low quality content type.

Specifically, this embodiment may perform the mining in the way of keywords and gambling sites filter words, and gambling content is often more obscure in actual scenes, which is difficult to find through titles or text content. Therefore, a batch of gambling sites is determined in advance and mined in the way of keywords and gambling sites. When the first matching result indicates that the first matching is successful, that is, when some keywords in the current article are successfully matched with the preset keywords related to gambling, it is further determined whether the current website belongs to the above gambling sites. In response to the current website belonging to the above gambling sites, it is determined that the current article is the public opinion data of low quality content related to gambling.

In this way, it is possible to mine the public opinion data of gambling, which improves correctness of the public opinion data mining related to gambling.

Certainly, the method mentioned above is further used for identify public opinion data of advertising and pornography.

As shown in FIG. 2, in Step S133, the current article is identified according to the data identification strategy of inaccurate sentiment analysis and the sentiment polarity label of the current article, to obtain a third identification result indicating whether the current article is the data of the sentiment analysis inaccurate type.

Sentiment analysis is a relatively mature technology, and there are several mature sentiment polarity analysis algorithms, such as, sentiment polarity analysis algorithm based on dictionary, sentiment polarity analysis algorithm based on k nearest neighbor (k_NN), sentiment polarity analysis algorithm based on Bayes, sentiment polarity analysis algorithm based on maximum entropy, sentiment polarity analysis algorithm based on support vector machine (SVM) and so on.

In the embodiment, the sentiment polarity label of the current article is obtained by analyzing the current article based on a first sentiment polarity analysis algorithm during a publishing process of the current article.

In this way, a second sentiment polarity analysis algorithm different from the first sentiment polarity analysis algorithm is used for performing sentiment analysis on an article to be analyzed, to obtain a current sentiment polarity of the article to be analyzed.

Then, it is determined whether the current article is data of the inaccurate sentiment analysis type based on whether the current sentiment polarity is consistent with the sentiment polarity label.

In this way, the article of inaccurate sentiment analysis is accurately mined by the embodiment, which provides favorable data support for further adjusting the sentiment polarity analysis algorithm.

Specifically, when the technical solution of the present disclosure is applied to a public opinion system, it is possible to determine whether a polarity of the current sentiment polarity is opposite to a polarity of the sentiment polarity label, and whether a confidence of the current sentiment polarity output by the second sentiment polarity analysis algorithm is greater than or equal to a preset threshold. In response to the polarity of the current sentiment polarity being opposite to the polarity of the sentiment polarity label, and the confidence of the current sentiment polarity output by the second sentiment polarity analysis algorithm being greater than or equal to the preset threshold, it is determined that the current article is the public opinion data of inaccurate sentiment analysis type.

In actual sentiment analysis scenarios, the inventors of the present disclosure have found that users are much more disgusted with positive and negative article sentiment analysis errors than with neutral polarity errors. That is, the users are very sensitive to the determination of positive and negative tendencies. For example, "someone was sentenced to three years in prison for a certain crime", the sentimental tendency of this sentence is neutral or negative. However, when this sentence is determined to be positive, it would be unacceptable. Another example: "from July 1st, A city will fully implement waste classification", the sentimental tendency of this sentence is neutral or positive. However, when this sentence is determined to be negative, it is an obvious error.

Therefore, based on the above observation and analysis of use's psychology, the rules for mining data of the inaccurate sentiment analysis type adopted in the present disclosure may include the following three parts. Rule a, the polarity of the current sentiment obtained based on the second sentiment polarity analysis algorithm is opposite to the polarity of the sentiment polarity label obtained based on the first sentiment polarity analysis algorithm. Rule b, opposite polarity indicates that the polarity is positive or negative. Rule c, the confidence of the current sentiment polarity obtained by the second sentiment polarity analysis algorithm is above 0.95. When all the above three rules are satisfied, this case is determined to be the badcase of inaccurate sentiment analysis.

It is seen that the mining mode of the public opinion data of inaccurate sentiment analysis through the three rules of the present embodiment is more in line with the user's psychology. In this way, the mined public opinion data of inaccurate sentimental analysis is more accurate.

The second sentiment polarity analysis algorithm is the analysis algorithm provided by an NLPC tool; and the first sentiment polarity analysis algorithm is a different sentiment analysis algorithm from the analysis algorithm provided by the NLPC tool.

Specifically, NLPC first pre-trains the language model ERNIE on large data sets, and then trains a sentiment polarity classification model based on ERNIE. A predicted value of ERNIE model is taken as the confidence, that is, confidence=soft max (y), and y is a vector of a polarity predicted by the ERNIE model.

As is seen from the embodiment shown in FIG. 2, the data mining is directly divided into three categories when the second embodiment of the present disclosure is adopted for data mining.

Figure 3:
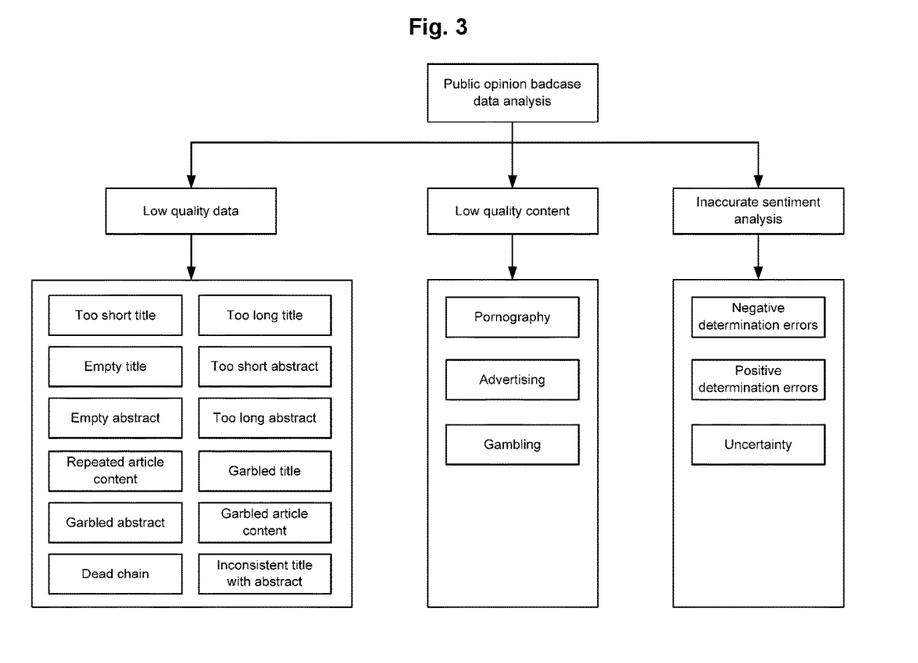
FIG. 3 is a schematic diagram of a public opinion data classification when the data mining method is applied to a public opinion system according to an optional embodiment of the present disclosure.

FIG. 3 is a schematic diagram of a public opinion data classification when the data mining method is applied to a public opinion system according to an optional embodiment the present disclosure. As shown in FIG. 3, public opinion badcase data is divided into three categories: low quality data, low quality content and inaccurate sentiment analysis.

The category of low quality data is divided into 12 subcategories according to different specific matching rules: too short title, too long title, empty title, too short abstract, empty abstract, too long abstract, repeated article content, garbled title, garbled abstract, garbled article content, dead chain and inconsistent title with abstract. Certainly, when matching rules are added, the public opinion data of low quality data is divided into more subcategories.

The category of low quality content is divided into three subcategories according to the content of the article: pornography-related data, data of advertisement and gambling-related data.

The category of inaccurate sentiment analysis is divided into three subcategories according to the specific errors of sentiment polarity: negative determination errors, positive determination errors and uncertainty.

Figure 4A:
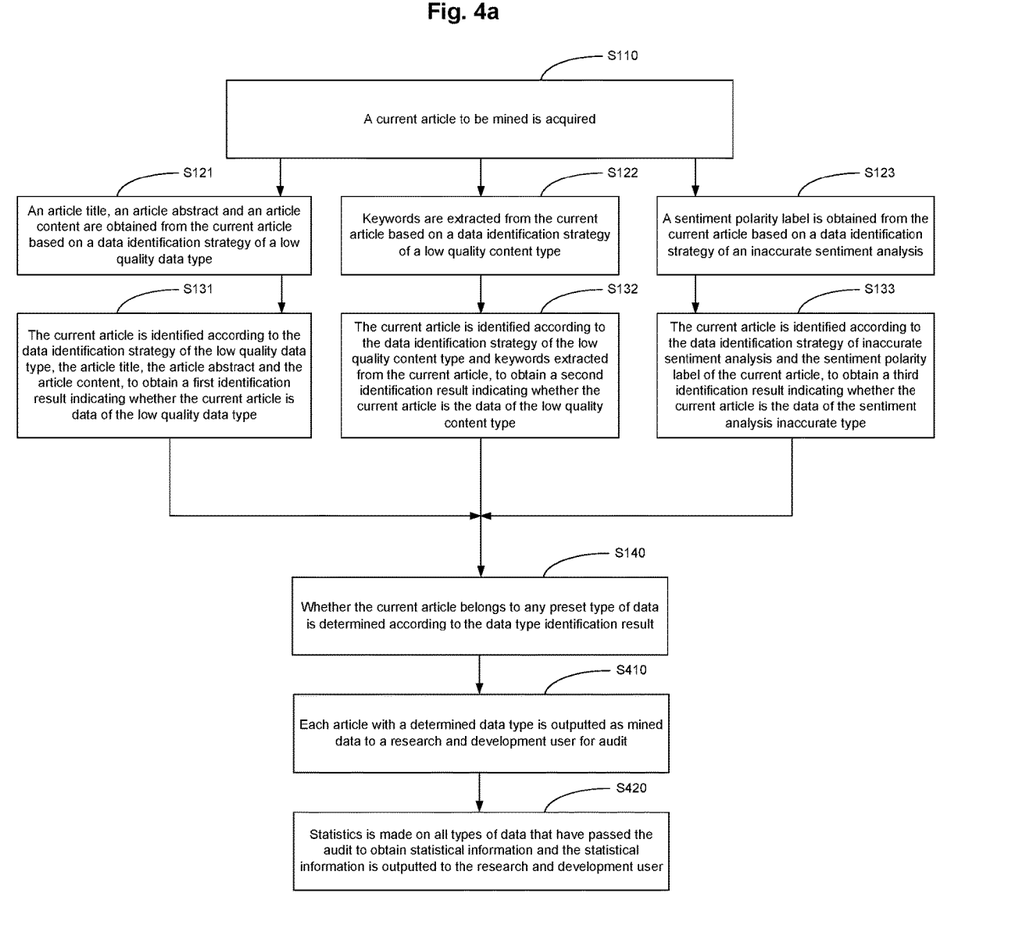
FIG. 4*a* is a flow diagram of a data mining method according to a third embodiment of the present disclosure.

Through the above data mining method, it is possible to find a certain amount of badcases from web page data. In practical application, in order to ensure for acquiring more accurate mining results, a manual audit is further carried out. Specifically, FIG. 4a is a flow diagram of a data mining method according to a third embodiment of the present disclosure. As shown in FIG. 4a, the following steps are added to the flow on the basis of FIG. 2.

In Step S410, each article with a determined data type is outputted as mined data to a research and development user for audit.

In Step S420, statistics is made on all types of data that have passed the audit to obtain statistical information and the statistical information is outputted to the research and development user.

In this embodiment, unlike the traditional manual audit mode, it is possible to not adopt an excel mode. In this embodiment, amis platform of Baidu is used for the audit, which supports multiple people for audit. The completed audit results will be entered into a database synchronously, and real-time statistics and calculation of audit rate will be supported, and real-time reports will be produced.

Figure 4B:
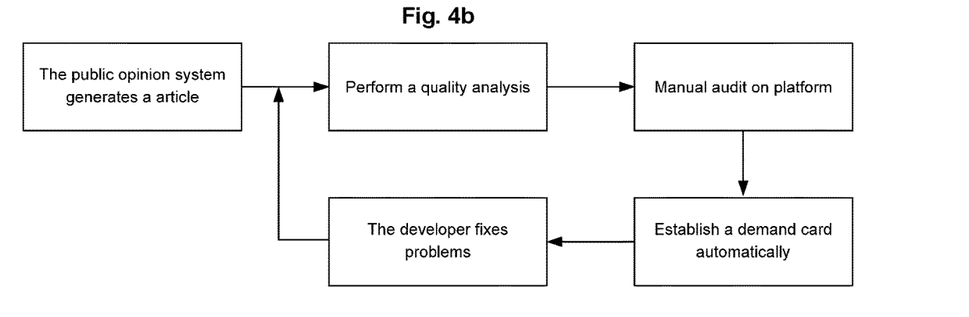
FIG. 4*b* is a schematic diagram of an overall process of a public opinion analysis when the data mining method is applied to the public opinion system according to an optional embodiment of the present disclosure.

FIG. 4b is a schematic diagram of an overall process of a public opinion analysis when the data mining method is applied to the public opinion system according to an optional embodiment of the present disclosure. As shown in FIG. 4b, articles generated by the public opinion system are obtained first. The above public opinion data mining method is used for performing a quality analysis on each article, to obtain low-quality articles with low quality data, low quality content and inaccurate sentiment analysis. Low quality problems are obtained through manual audit on the platform. The public opinion system automatically establishes a demand card, and then a developer fixes these problems. After the problems are fixed, the process gets back to obtaining the articles generated by the public opinion system, to regenerate a public opinion analysis result. In this way, a closed loop is formed from production data, to public opinion monitoring (namely, public opinion data mining), to problem fixing, and then to production data.

In this embodiment, an automatic card creation function provided by amis platform of Baidu is used. After the user clicks a create card button, the demand card is automatically created. Demand cards are created according to the type definition of badcase, and each type of public opinion data corresponds to one demand card. Information displayed on the demand card may include: a type of badcase, the number of badcases, a priority of fix, and a discovery phase of the badcase. The information displayed on the demand card may further include: specific jump links of this type of badcase, which is convenient for the research and development personnel to view specific badcases, fix and annotate them.

At present, the priority of fix is mainly determined by a proportion of the number of this type of badcases in the total number of samples mined (namely badcase recall rate).

Specific rating rules are as follows:
recall rate≥3% is rated as P0-Highest
1%<recall rate<3% is rated as P1-Middle
recall rate≤1% is rated as P2-Low In this embodiment, there are many methods for fixing the problem. The most direct fixing method is to delete all badcases under this type in the database of the system, and no longer show the deleted badcases online. However, this method treats the symptoms but not the root cause, since the article library of public opinion is updated in real time. Therefore, it is also possible to perform an optimization in terms of policy algorithms, and the specific badcases require different solution strategies.

For badcase fixing solutions such as short or long or empty title or abstract, garbled title or abstract, dead chain and repeated article content:

the public opinion system has a set of filtering system when generating the articles, and the public opinion system is configured to set relevant thresholds or optimizes a site white list when the public opinion system generates the articles.

For a situation of inconsistent title with abstract: this situation shows that an effect of an abstract extraction model used by the public opinion system does not meet the expectation, and it is necessary to optimize the corresponding model strategy.

Badcase optimization for advertising, gambling and pornography also required to be optimized from the model level.

For a situation of inaccurate sentiment analysis: when a badcase of sentiment analysis occurs, it shows that the sentiment analysis model algorithm adopted by public opinion system does not work for some badcases, thus it is necessary to analyze specific badcases, expand the training set and retrain the model.

According to another embodiment of the present disclosure, a data mining apparatus is further provided.

Figure 5:
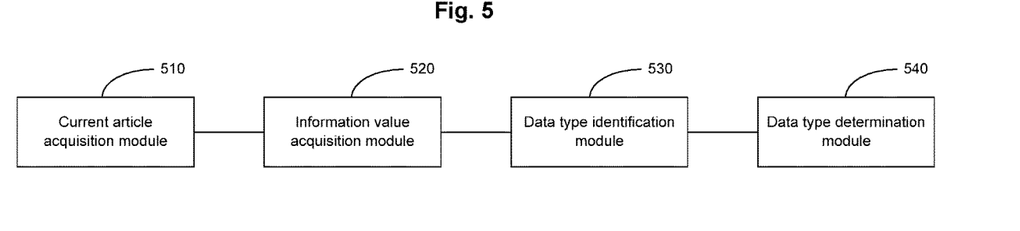
FIG. 5 is a flow diagram of a data mining apparatus according to a first embodiment of the present disclosure.

FIG. 5 is a flow diagram of a data mining apparatus according to a first embodiment of the present disclosure. As shown in FIG. 5, the data mining apparatus includes:

a current article acquisition module 510, configured to acquire a current article to be mined;

an information value acquisition module 520, configured to obtain information values required for each data identification strategy of multiple data identification strategies from the current article, and each data identification strategy is used for identifying a preset type of data;

a data type identification module 530, configured to identify a data type of the current article according to the information values required for each data identification strategy to obtain a data type identification result; and a data type determination module 540, configured to determine whether the current article belongs to any preset type of data according to the data type identification result.

Through the above embodiments, the data mining apparatus provided by the present disclosure may perform data classification mining on web page data based on the multiple data identification strategies, to effectively mine different types of data. Compared with the commonly used manual data mining on the web page data, it is more efficient and accurate.

In this embodiment, the preset types of data may include: low quality data, low quality content, and inaccurate sentiment analysis.

Figure 6:
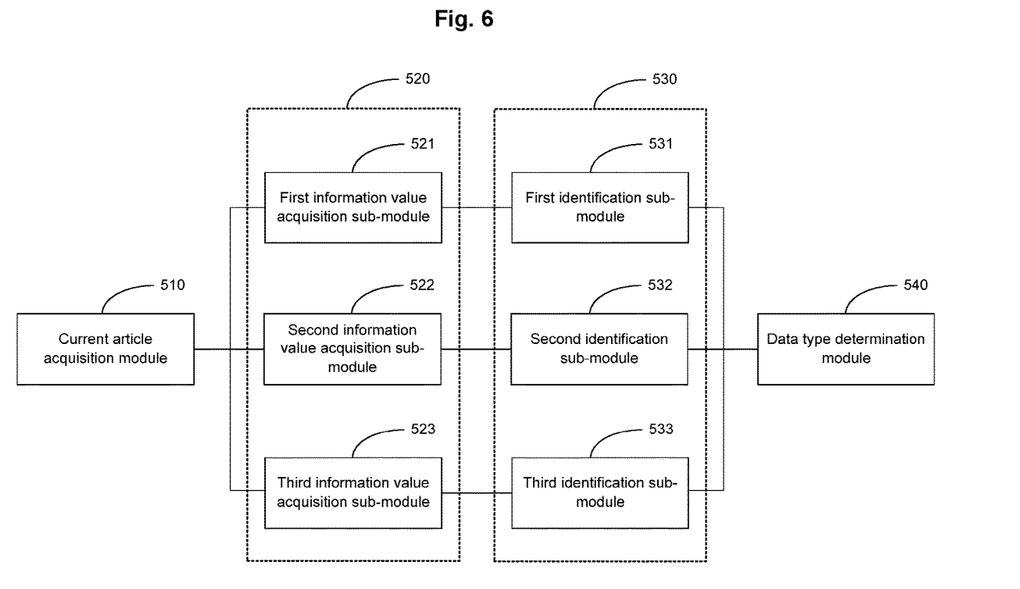
FIG. 6 is a flow diagram of a data mining apparatus according to a second embodiment of the present disclosure.

FIG. 6 is a flow diagram of a data mining apparatus according to a second embodiment of the present disclosure. As shown in FIG. 6, the data mining apparatus is based on FIG. 5, the information value acquisition module 520 includes:

a first information value acquisition sub-module 521, configured to obtain an article title, an article abstract and an article content from the current article based on a data identification strategy of a low quality data type;

a second information value acquisition sub-module 522, configured to extract keywords from the current article based on a data identification strategy of a low quality content type; and a third information value acquisition sub-module 523, configured to obtain a sentiment polarity label from the current article based on a data identification strategy of an inaccurate sentiment analysis.

As shown in FIG. 6, the data type identification module 530 includes:

a first identification sub-module 531, configured to identify the current article according to the data identification strategy of the low quality data type, the article title, the article abstract and the article content, to obtain a first identification result indicating whether the current article is data of the low quality data type;

a second identification sub-module 532, configured to identify the current article according to the data identification strategy of the low quality content type and the keywords extracted from the current article, to obtain a second identification result indicating whether the current article is data of the low quality content type; and a third identification sub-module 533, configured to identify the current article according to the data identification strategy of the inaccurate sentiment analysis and the sentiment polarity label of the current article, to obtain a third identification result indicating whether the current article is data of the inaccurate sentiment analysis type.

The first identification sub-module 531 is further configured to determine whether the article title, the article abstract and the article content of the current article meet preset data rules of the low quality data type; and in response to determining that the article title, the article abstract and the article content meet the preset data rules of the low quality data type, determine that the current article is the data of the low quality data type.

The first information value acquisition sub-module 521 is further configured to obtain URL information of the current article. The first identification sub-module 531 is further configured to periodically detect whether the URL information of the current article include an inaccessible dead chain phenomenon based on a preset dead chain periodic detection rule; and determine that the current article is the data of the low quality data type in response to the URL information of the current article including the inaccessible dead chain phenomenon.

The second identification sub-module 532 may include:

a first matching unit, configured to perform a first matching on the keywords extracted from the current article with preset keywords corresponding to the data of the low quality content type, to obtain a first keyword matching result; and a determination unit, configured to determine whether the current article is the data of the low quality content type based on the first keyword matching result.

The determination unit is further configured to determine that the current article is the data of the low quality content type in response to the first matching result indicating that the first matching is successful; or The determination unit is further configured to: perform a second matching on the keywords extracted from the current article with preset trusted keywords in response to the first matching result indicating that the first matching is successful, to obtain a second keyword matching result; determine that the current article is not the data of the low quality content type in response to the second keyword matching result indicating that the second matching is successful; and determine that the current article is the data of the low quality content type in response to the second keyword matching result indicating that the second matching is unsuccessful; or the determination unit is further configured to: determine a current website to which the current article belongs in response to the first matching result indicating that the first matching is successful; determine whether the current website is a website to which the preset data of the low quality content type belongs; and in response to determining that the current website is the website to which the preset data of the low quality content type belongs, determine that the current article is the data of the low quality content type.

The sentiment polarity label of the current article is obtained by analyzing the current article based on a first sentiment polarity analysis algorithm during a publishing process of the current article.

The third identification sub-module 533 is further configured to: perform a sentiment analysis on an article to be analyzed based on a second sentiment polarity analysis algorithm, to obtain a current sentiment polarity of the article to be analyzed, the second sentiment polarity analysis algorithm and the first sentiment polarity analysis algorithm being different algorithms; and determine whether the current article is the data of the inaccurate sentiment analysis type based on whether the current sentiment polarity is consistent with the sentiment polarity label.

Figure 7:
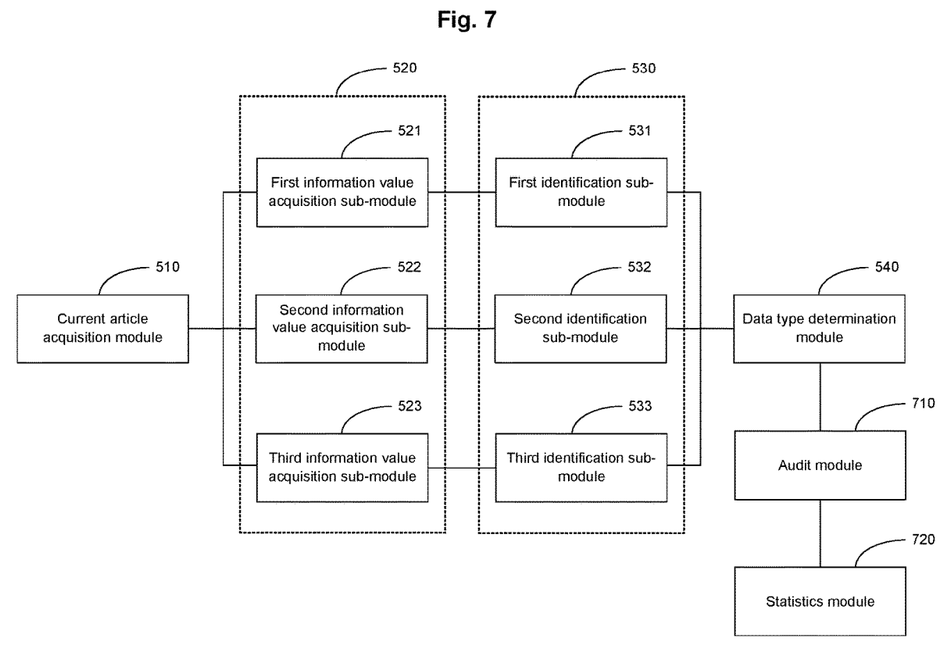
FIG. 7 is a flow diagram of a data mining apparatus according to a third embodiment of the present disclosure.

FIG. 7 is a flow diagram of a data mining apparatus according to a third embodiment of the present disclosure. As shown in FIG. 7, the data mining apparatus, on the basis of FIG. 6, further includes:

an audit module 710, configured to output each web page article with a determined data type as mined data to a research and development user for audit; and a statistics module 720, configured to make statistics on all types of data that have passed the audit to obtain statistical information and output the statistical information to the research and development user.

In the technical solution of the present disclosure, the acquisition, storage and application of the personal information of users are in line with the provisions of relevant laws and regulations, and do not violate public order and good customs.

According to some embodiments of the present disclosure, an electronic device is further provided, a readable storage medium is further provided, and a computer program product is further provided.

Figure 8:
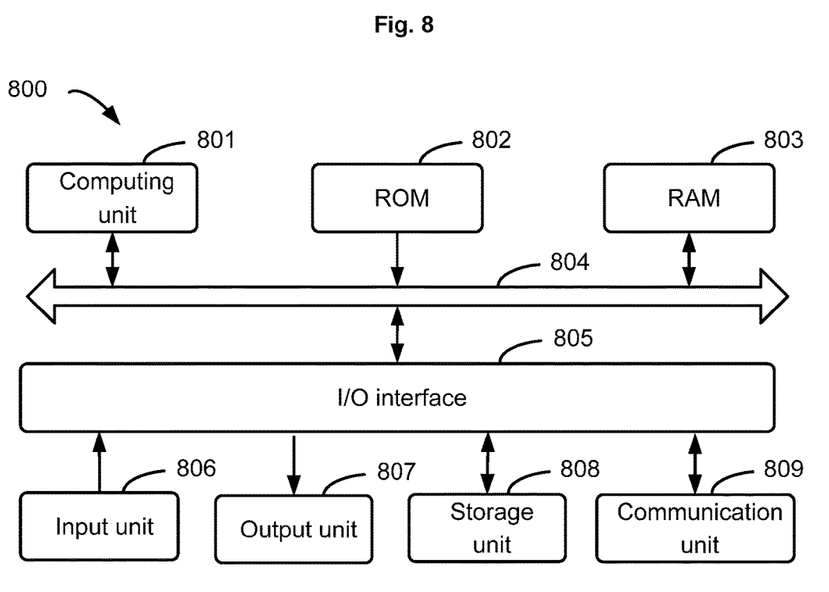
FIG. 8 is a block diagram of an electronic device for implementing the data mining method according to an embodiment of the present disclosure.

FIG. 8 shows a schematic block diagram of an electronic device 800 according to an embodiment of the present disclosure. The electronic device is intended to represent various forms of digital computers, such as laptops, desktops, worktables, personal digital assistants, servers, blade servers, mainframes, and other suitable computers. The electronic device may also represent various forms of mobile apparatuses, such as personal digital assistants, cellular phones, smart phones, wearable devices and other similar computing apparatuses. The components shown here, their connections and relationships, and their functions, are meant to be exemplary, and are not meant to limit implementations of the present disclosure described and/or claimed in this document.

As shown in FIG. 8, the electronic device 800 includes a computing unit 801 that may execute various appropriate actions and processes according to a computer program stored in a Read Only Memory (ROM) 802 or a computer program loaded from a storage unit 808 into a Random Access Memory (RAM) 803. In the RAM 803, various programs and data required for the operation of the apparatus 800 may also be stored. The computing unit 801, the ROM 802, and the RAM 803 are connected with each other through a bus 804. An input/output (I/O) interface 805 is further connected with the bus 804.

Multiple components in the electronic device 800 are connected with the I/O Interface 805, which include an input unit 806, such as a keyboard, a mouse and the like; an output unit 807, such as various types of displays, speakers and the like; a storage unit 808, such as a magnetic disk, an optical disk and the like; and a communication unit 809, such as a network card, a modem, a wireless communication transceiver and the like. The communication unit 809 allows the apparatus 800 to exchange information or data of other apparatuses through a computer network such as the Internet and/or various telecommunication networks.

The computing unit 801 may be a variety of general purpose and/or special purpose processing components with processing and computing capabilities. Some examples of computing unit 801 include, but are not limited to, a central processing unit (CPU), a graphics processing unit (GPU), various specialized artificial intelligence (AI) computing chips, various computing units running machine learning model algorithms, digital signal processors (DSP), and any suitable processors, controllers, microcontrollers, and the like. The computing unit 801 executes various methods and processes described above, such as any of the data mining methods described above. For example, in some embodiments the data mining method may be implemented as a computer software program tangibly contained in a machine-readable medium, such as the storage unit 808. In some embodiments, part or all of the computer program may be loaded and/or installed on the apparatus 800 via the ROM 802 and/or the communication unit 809. When a computer program is loaded into the RAM 803 and executed by the computing unit 801, at least one steps of the data mining method described above may be performed. Alternatively, in other embodiments, the computing unit 801 may be configured to perform any of the data mining methods described above by any other suitable means (e.g., by means of firmware).

Various embodiments of the systems and techniques described above herein may be implemented in digital electronic circuitry systems, integrated circuit systems, field programmable gate arrays (FPGA), application specific integrated circuits (ASIC), special purpose standard products (ASSP), system-on-chip systems (SOC), load programmable logic devices (CPLD), computer hardware, firmware, software, and/or combinations thereof. These various embodiments may include: implementing in at least one computer programs, the at least one computer programs may be executed and/or interpreted on a programmable system including at least one programmable processor, the programmable processor, which may be a special purpose or general purpose programmable processor, may receive data and instructions from a storage system, at least one input apparatus, and at least one output apparatus, and transmit the data and instructions to the storage system, the at least one input apparatus, and the at least one output apparatus.

Program code for implementing the methods of the present disclosure may be written in any combination of at least one programming languages. The program code may be provided to a processor or controller of a general purpose computer, a special purpose computer, or other programmable data processing apparatus such that the program code, when being executed by the processor or controller, enables the functions or operations specified in the flow chart and/or block diagram to be implemented. Program code may be executed entirely on a machine, partly on a machine, as a stand-alone software package, partly on a machine and partly on a remote machine, or entirely on a remote machine or server.

In the context of the present disclosure, a machine-readable medium may be a tangible medium that may contain or store programs for use by or in conjunction with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses or devices, or any suitable combination of the above. A more specific example of the machine-readable storage medium may include an electrical connection based on at least one wires, portable computer disk, hard disk, random access memory (RAM), read only memory (ROM), erasable programmable read-only memory (EPROM or flash memory), optical fiber, portable compact disk-read only memory (CD-ROM), optical storage device, magnetic storage device, or any suitable combination of the above.

To provide for interaction with a user, the systems and techniques described herein may be implemented on a computer having: a display apparatus (e.g., a CRT (cathode ray tube) or LCD (liquid crystal display) monitor) for displaying information to a user; and a keyboard and a pointing apparatus (e.g., a mouse or a trackball) through which the user can provide input to the computer. Other kinds of apparatuses are further used to provide for interaction with a user. For example, feedback provided to the user is any form of sensory feedback, e.g., visual feedback, auditory feedback, or tactile feedback; and input from the user is received in any form, including acoustic, speech, or tactile input.

The systems and techniques described herein may be implemented in a computing system including back-end components (e.g., as a data server), or a computing system that includes middleware components (e.g. an application server), or a computing system including front-end components (e.g., a user computer having a graphical user interface or web browser through which a user can interact with embodiments of the systems and techniques described herein), or a computing system including any combination of the back-end components, the middleware components, or the front-end components. The components of the system may be interconnected by digital data communication (e.g., a communication network) in any form or medium. Examples of communication networks include a local area network (LAN), a wide area network (WAN) and the Internet.

The computer system may include a client and a server. The client and the server are generally far away from each other and usually interact through communication networks. The relationship of client and server arises by computer programs running on the respective computers and having a client-server relationship to each other.

It should be understood that steps is reordered, added, or deleted using the various forms of flow shown above. For example, the steps described in the present disclosure may be executed in parallel, sequentially, or in different orders, so long as the desired results of the technical solution disclosed in the present disclosure is achieved, there is no limitation herein.

The above specific embodiments do not limit the scope of protection of the present disclosure. Those skilled in the art will appreciate that various modifications, combinations, sub-combinations and substitutions may be made depending on design requirements and other factors. Any modifications, equivalents, substitutions, improvements, etc. made within the spirit and principles of this disclosure shall be included within the scope of protection of the present disclosure.

What is claimed is:

1. A data mining method comprising:
    acquiring a current article to be mined;
    obtaining information values required for each data identification strategy of a plurality of data identification strategies from the current article, wherein each data identification strategy is used for identifying a preset type of data;
    identifying a data type of the current article according to the information values required for each data identification strategy to obtain a data type identification result; and
    determining whether the current article belongs to any preset type of data according to the data type identification result;
    wherein preset types of the data comprise low quality data, low quality content, and inaccurate sentiment analysis; and obtaining the information values required for each data identification strategy of the plurality of data identification strategies from the current article comprises:
        obtaining an article title, an article abstract and an article content from the current article based on a data identification strategy of a low quality data type;
        extracting keywords from the current article based on a data identification strategy of a low quality content type; and
        obtaining a sentiment polarity label from the current article based on a data identification strategy of an inaccurate sentiment analysis.

2. The method as claimed in claim 1, wherein identifying the data type of the current article according to the information values required for each data identification strategy to obtain the data type identification result comprises:
    identifying the current article according to the data identification strategy of the low quality data type, the article title, the article abstract and the article content, to obtain a first identification result indicating whether the current article is data of the low quality data type;
    identifying the current article according to the data identification strategy of the low quality content type and the keywords extracted from the current article, to obtain a second identification result indicating whether the current article is data of the low quality content type; and
    identifying the current article according to the data identification strategy of the inaccurate sentiment analysis and the sentiment polarity label of the current article, to obtain a third identification result indicating whether the current article is data of the inaccurate sentiment analysis type.

3. The method as claimed in claim 2, wherein identifying the current article according to the data identification strategy of the low quality data type, the article title, the article abstract and the article content, to obtain the first identification result indicating whether the current article is the data of the low quality data type comprises:
    determining whether the article title, the article abstract and the article content of the current article meet preset data rules of the low quality data type; and
    in response to determining that the article title, the article abstract and the article content meet the preset data rules of the low quality data type, determining that the current article is the data of the low quality data type.

4. The method as claimed in claim 3, wherein determining whether the article title, the article abstract and the article content of the current article meet the preset data rules of the low quality data type, and in response to determining that the article title, the article abstract and the article content meet the preset data rules of the low quality data type, determining that the current article is the data of the low quality data type, comprises:
    determining whether the article title, the article abstract and the article content of the determining whether the article title, the article abstract and the article content of the current article meet at least one of a preset text length rule, a garbled rule and a rule for whether the article title matches the article abstract; and
    in response to determining that the article title, the article abstract and the article content meet at least one of the preset text length rule, the garbled rule and the rule for whether the article title matches the article abstract, determining that the current article is the data of the low quality data type.

5. The method as claimed in claim 4, wherein the rule for whether the article title matches the article abstract comprises:
    determining that the current article is the data of the low quality data type in response to determining that the current article meets at least one of a text mismatch between the article title and the article abstract, and a semantic mismatch between the article title and the article abstract.

6. The method as claimed in claim 3, wherein obtaining the information values required for each data identification strategy of the plurality of data identification strategies from the current article further comprises:
    obtaining Uniform Resource Locator (URL) information of the current article; and
    identifying the current article according to the data identification strategy of the low quality data type, the article title, the article abstract and the article content, to obtain the first identification result indicating whether the current article is the data of the low quality data type further comprises:
    periodically detecting whether the URL information of the current article comprises an inaccessible dead chain phenomenon based on a preset dead chain periodic detection rule; and
    determining that the current article is the data of the low quality data type in response to the URL information of the current article comprising the inaccessible dead chain phenomenon.

7. The method as claimed in claim 2, wherein identifying the current article according to the data identification strategy of the low quality content type and the keywords extracted from the current article, to obtain the second identification result indicating whether the current article is the data of the low quality content type comprises:
    performing a first matching on the keywords extracted from the current article with preset keywords corresponding to the data of the low quality content type, to obtain a first keyword matching result; and determining whether the current article is the data of the low quality content type based on the first keyword matching result.

8. The method as claimed in claim 7, wherein determining whether the current article is the data of the low quality content type based on the first keyword matching result comprises: determining that the current article is the data of the low quality content type in response to the first matching result indicating that the first matching is successful; or determining whether the current article is the data of the low quality content type based on determining whether the current article is the data of the low quality content type based on the first keyword matching result comprises: performing a second matching on the keywords extracted from the current article with preset trusted keywords in response to the first matching result indicating that the first matching is successful, to obtain a second keyword matching result; determining that the current article is not the data of the low quality content type in response to the second keyword matching result indicating that the second matching is successful; and determining that the current article is the data of the low quality content type in response to the second keyword matching result indicating that the second matching is unsuccessful; or determining whether the current article is the data of the low quality content type based on determining whether the current article is the data of the low quality content type based on the first keyword matching result comprises: determining a current website to which the current article belongs in response to the first matching result indicating that the first matching is successful; determining whether the current website is a website to which the preset data of the low quality content type belongs; and in response to determining that the current website is the website to which the preset data of the low quality content type belongs, determining that the current article is the data of the low quality content type.

9. The method as claimed in claim 2, wherein the sentiment polarity label of the current article is obtained by analyzing the current article based on a first sentiment polarity analysis algorithm during a publishing process of the current article;

identifying the current article according to the data identification strategy of inaccurate sentiment analysis and the sentiment polarity label of the current article, to obtain the third identification result indicating whether the current article is the data of the inaccurate sentiment analysis type comprises:

performing a sentiment analysis on an article to be analyzed based on a second sentiment polarity analysis algorithm, to obtain a current sentiment polarity of the article to be analyzed, the second sentiment polarity analysis algorithm and the first sentiment polarity analysis algorithm being different algorithms; and determining whether the current article is the data of the inaccurate sentiment analysis type based on whether the current sentiment polarity is consistent with the sentiment polarity label.

10. The method as claimed in claim 9, wherein determining whether the current article is the data of the inaccurate sentiment analysis type based on whether the current sentiment polarity is consistent with the sentiment polarity label comprises:

determining whether a polarity of the current sentiment polarity is opposite to a polarity of the sentiment polarity label, and whether a confidence of the current sentiment polarity output by the second sentiment polarity analysis algorithm is greater than or equal to a preset threshold; and in response to determining that the polarity of the current sentiment polarity is opposite to the polarity of the sentiment polarity label, and the confidence of the current sentiment polarity is greater than or equal to the preset threshold, determining that the current article is the data of the inaccurate sentiment analysis type.

11. The method as claimed in claim 1, the method further comprises:

outputting each article with a determined data type as mined data to a research and development user for audit; and making statistics on all types of data that have passed the audit to obtain statistical information and outputting the statistical information to the research and development user.

12. An electronic device comprising:

at least one processor; and a memory in communication connection with the at least one processor, wherein the memory is configured to store instructions executable by the at least one processor and, when being executed by the at least one processor, the instructions is used for enabling the at least one processor to execute the following steps:

acquiring a current article to be mined;

obtaining information values required for each data identification strategy of a plurality of data identification strategies from the current article, wherein each data identification strategy is used for identifying a preset type of data;

identifying a data type of the current article according to the information values required for each data identification strategy to obtain a data type identification result; and determining whether the current article belongs to any preset type of data according to the data type identification result;

wherein preset types of the data comprise low quality data, low quality content, and inaccurate sentiment analysis; and the instructions is used for enabling the at least one processor to execute the following steps:

obtaining an article title, an article abstract and an article content from the current article based on a data identification strategy of a low quality data type;

extracting keywords from the current article based on a data identification strategy of a low quality content type; and obtaining a sentiment polarity label from the current article based on a data identification strategy of an inaccurate sentiment analysis.

13. The electronic device as claimed in claim 12, wherein the instructions is used for enabling the at least one processor to execute the following steps:

identifying the current article according to the data identification strategy of the low quality data type, the article title, the article abstract and the article content, to obtain a first identification result indicating whether the current article is data of the low quality data type;

identifying the current article according to the data identification strategy of the low quality identifying the current article according to the data identification strategy of the low quality content type and the keywords extracted from the current article, to obtain a second identification result indicating whether the current article is data of the low quality content type; and identifying the current article according to the data identification strategy of the inaccurate sentiment analysis and the sentiment polarity label of the current article, to obtain a third identification result indicating whether the current article is data of the inaccurate sentiment analysis type.

14. The electronic device as claimed in claim 13, wherein the instructions is used for enabling the at least one processor to execute the following steps: determining whether the article title, the article abstract and the article content of the current article meet preset data rules of the low quality data type; and in response to determining that the article title, the article abstract and the article content meet the preset data rules of the low quality data type, determining that the current article is the data of the low quality data type;

or, wherein the instructions is used for enabling the at least one processor to execute the following steps: performing a first matching on the keywords extracted from the current article with preset keywords corresponding to the data of the low quality content type, to obtain a first keyword matching result; and determining whether the current article is the data of the low quality content type based on the first keyword matching result;

or, wherein the sentiment polarity label of the current article is obtained by analyzing the current article based on a first sentiment polarity analysis algorithm during a publishing process of the current article; the instructions is used for enabling the at least one processor to execute the following steps: performing a sentiment analysis on an article to be analyzed based on a second sentiment polarity analysis algorithm, to obtain a current sentiment polarity of the article to be analyzed, the second sentiment polarity analysis algorithm and the first sentiment polarity analysis algorithm being different algorithms; and determining whether the current article is the data of the inaccurate sentiment analysis type based on whether the current sentiment polarity is consistent with the sentiment polarity label.

15. A non-transitory storage medium storing computer instructions, wherein the computer instructions is used for enabling the computer to execute the following steps:

acquiring a current article to be mined;

obtaining information values required for each data identification strategy of a plurality of data identification strategies from the current article, wherein each data identification strategy is used for identifying a preset type of data;

identifying a data type of the current article according to the information values required for each data identification strategy to obtain a data type identification result; and determining whether the current article belongs to any preset type of data according to the data type identification result;

wherein preset types of the data comprise low quality data, low quality content, and inaccurate sentiment analysis; and the computer instructions is used for enabling the computer to execute the following steps: obtaining an article title, an article abstract and an article content from the current article based on a data identification strategy of a low quality data type;

extracting keywords from the current article based on a data identification strategy of a low quality content type; and obtaining a sentiment polarity label from the current article based on a data identification strategy of an inaccurate sentiment analysis.

16. The non-transitory storage medium as claimed in claim 15, wherein the computer instructions is used for enabling the computer to execute the following steps:

identifying the current article according to the data identification strategy of the low quality data type, the article title, the article abstract and the article content, to obtain a first identification result indicating whether the current article is data of the low quality data type;

identifying the current article according to the data identification strategy of the low quality identifying the current article according to the data identification strategy of the low quality content type and the keywords extracted from the current article, to obtain a second identification result indicating whether the current article is data of the low quality content type; and identifying the current article according to the data identification strategy of the inaccurate sentiment analysis and the sentiment polarity label of the current article, to obtain a third identification result indicating whether the current article is data of the inaccurate sentiment analysis type.

17. The non-transitory storage medium as claimed in claim 16, wherein the computer instructions is used for enabling the computer to execute the following steps: determining whether the article title, the article abstract and the article content of the current article meet preset data rules of the low quality data type; and in response to determining that the article title, the article abstract and the article content meet the preset data rules of the low quality data type, determining that the current article is the data of the low quality data type;

or, wherein the computer instructions is used for enabling the computer to execute the following steps: performing a first matching on the keywords extracted from the current article with preset keywords corresponding to the data of the low quality content type, to obtain a first keyword matching result; and determining whether the current article is the data of the low quality content type based on the first keyword matching result;

or, wherein the sentiment polarity label of the current article is obtained by analyzing the current article based on a first sentiment polarity analysis algorithm during a publishing process of the current article; the computer instructions is used for enabling the computer to execute the following steps: performing a sentiment analysis on an article to be analyzed based on a second sentiment polarity analysis algorithm, to obtain a current sentiment polarity of the article to be analyzed, the second sentiment polarity analysis algorithm and the first sentiment polarity analysis algorithm being different algorithms; and determining whether the current article is the data of the inaccurate sentiment analysis type based on whether the current sentiment polarity is consistent with the sentiment polarity label.

* * * * *